United States Patent

Wachta

[15] 3,707,654
[45] Dec. 26, 1972

[54] SERIES-PARALLEL ELECTRICAL CIRCUIT

[72] Inventor: Zygmunt A. Wachta, Boston, Mass.

[73] Assignee: Allis-Chalmers Manufacturing Company, Milwaukee, Wis.

[22] Filed: May 26, 1971

[21] Appl. No.: 147,132

[52] U.S. Cl................................317/157, 317/137
[51] Int. Cl..............................................H01h 47/10
[58] Field of Search........307/109, 110, 37; 317/137, 317/157; 320/1

[56] References Cited

UNITED STATES PATENTS

| | | | |
|---|---|---|---|
| 2,221,573 | 11/1940 | Bruckman | 307/110 X |
| 3,229,124 | 1/1966 | Schofield | 307/110 |
| 3,496,378 | 2/1970 | Sakamoto | 307/110 |
| 3,043,990 | 7/1962 | Lillquist | 307/37 |

*Primary Examiner*—Robert K. Schaefer
*Assistant Examiner*—William J. Smith
*Attorney*—Robert C. Sullivan, Lee H. Kaiser and Robert B. Benson

[57] ABSTRACT

A direct current electrical circuit in which any number of electrical devices may be energized in parallel with each other to momentarily provide a higher state of energization of the devices, or in which the devices may be energized in series with each other to provide a lower state of energization of the devices, with the circuit automatically reverting from the parallel energization state to the series energization state.

The invention is shown embodied in a trip coil circuit for a multi-pole electrical circuit breaker, such as a three-pole circuit breaker, in which each pole of the circuit breaker is provided with its own separate trip coil, including capacitor means in circuit with each respective trip coil whereby to place each respective trip coil electrically in parallel with the other trip coils across the direct current potential when the trip circuit is initially energized for tripping operation, and additional circuit means connecting the trip coils in series with each other across the direct current potential to provide an alternative current flow path for the trip coils when the capacitor means become substantially fully charged, and also to provide a series path through the trip coils whereby a supervisory signal device may monitor for trip circuit continuity prior to initiation of a tripping operation. The circuit thereby combines the advantages of the fast response time characteristic of a parallel circuit with the supervisory capability of a series circuit for monitoring circuit continuity of the plurality of trip coils.

21 Claims, 1 Drawing Figure

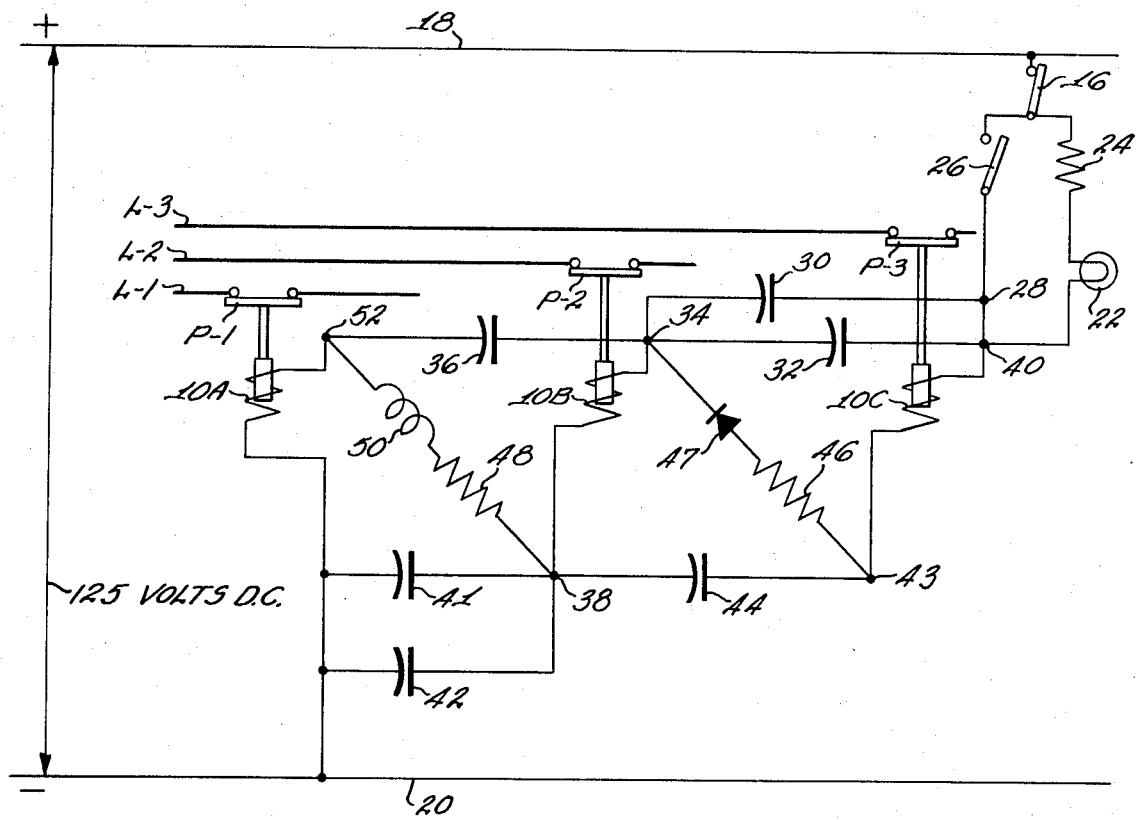

SERIES-PARALLEL ELECTRICAL CIRCUIT

BACKGROUND OF THE INVENTION

Field of the Invention

This invention relates to a direct current electrical circuit in which any number of electrical devices may be energized in parallel with each other to momentarily provide a higher state of energization of the devices, or in which the electrical devices may be energized in series with each other to provide a lower state of energization of the devices, with the circuit automatically reverting from the parallel energization state to the series energization state.

In its broader sense the invention is applicable to circuits for the energization of electrical devices such as solenoids, relays, counters, etc., in which it is desired to energize any number of devices in parallel to momentarily provide a higher energization state of the devices, with the circuit automatically reverting to a series connection of the devices which provides a lower state of energization of the devices.

The invention is particularly applicable to the energization of the trip coil circuit of a multi-pole electrical circuit breaker, and will be described in this environment. However, it will be understood that the invention is not limited to the described embodiment.

CROSS REFERENCE TO RELATED PATENT APPLICATIONS

The subject matter of the present application is related to the subject matter of an application of Herbert M. Pflanz entitled "Series-Parallel Electrical Circuit" filed concurrently with the present application.

DESCRIPTION OF THE PRIOR ART

In the prior art relating to trip coil circuitry for multi-pole circuit breakers, such as three-pole circuit breakers, in which each pole of the circuit breaker is provided with its own separate trip coil, it has been known in the past to connect the plurality of trip coils either in a parallel circuit arrangement with respect to each other, or, alternatively, in a series circuit arrangement with respect to each other. The parallel connection of the plurality of trip coils has the advantage of fast response time. A disadvantage of the parallel connection of the trip coil circuits used in the prior art, is the fact that it is not possible to have a single red indicating light or other suitable indicating means supervise the total trip circuit prior to initiation of the tripping operation whereby to indicate whether any one of the trip coils is open-circuited, since, with the parallel arrangement of the trip coils, if the circuit of one trip coil is open, the supervisory signal would still be connected to power through the other two parallel connected trip coils.

It is also known in the prior art instead of using the parallel connection of the trip coil circuits as hereinbefore described, to connect the trip coils in series with each other. The series connection of the trip coils has the advantage that the supervisory signaling means such as a red indicating light may be connected in series with the series-connected trip coils to supervise or monitor the circuit continuity of all of the trip coils since if any one of the series-connected trip coils has an open circuit, the red light or other supervisory signal will be extinguished. However, the series connection of the trip-coils as just described, has the disadvantage that since the trip circuit coil inductance is tripled, being the sum of the inductances of the three individual trip coils, the tripping current through each trip-coil builds up slowly, thereby causing the series connected trip-circuit to have a slow response time.

SUMMARY OF THE INVENTION

Accordingly, it is an object of the present invention to provide an electrical circuit in which any number of electrical devices may be energized in parallel with each other to momentarily provide a higher state of energization of the devices, or in which the electrical devices may be energized in series with each other to provide a lower state of energization of the devices, and in which the circuit automatically reverts from the parallel energization state to the series energization state.

It is another object of the present invention to provide trip circuitry for a multi-pole circuit breaker in accordance with which the plurality of trip coils are arranged to be energized for tripping operation in parallel with each other and to be deenergized in series with each other.

It is a further object of the invention to provide circuitry for the trip coils of a multi-pole circuit breaker which combines the advantages of both parallel-connected trip coils of the prior art and of series-connected trip coils of the prior art.

It is a further object of the invention to provide trip coil circuitry for a multi-pole circuit breaker which has the advantage of fast tripping response time characteristic of parallel-connected trip coils, while permitting a signal light or other supervisory means to monitor the circuit continuity of the plurality of trip coils and their readiness to trip their respective breaker poles prior to actual initiation of the tripping operation.

In achievement of these objectives, there is provided in accordance with this invention a direct current electrical circuit in which any number of electrical devices may be energized in parallel with each other to momentarily provide a higher state of energization of the devices, or in which the electrical devices may be energized in series with each other to provide a lower state of energization of the devices, with the circuit automatically reverting from the parallel energization state to the series energization state.

In a specific embodiment of the invention, there is provided a trip coil circuit for a multi-pole electrical circuit breaker, such as a three-pole circuit breaker, in which each pole of the circuit breaker is provided with its own separate trip coil, including capacitor means in circuit with each respective trip coil, whereby to place each respective trip coil in parallel with the other trip coils across the direct current potential when the trip circuit is initially energized for tripping operation, and additional circuit means connecting the trip coils in series with each other across the direct current potential to provide an alternative current flow path for the trip coils when the capacitor means become charged, and also to provide a series path through the trip coils whereby a supervisory signal device may monitor for trip circuit continuity prior to initiation of a tripping operation. The circuit thereby combines the advantages of the fast response time characteristic of a parallel circuit with the supervisory capability of a series circuit for monitoring circuit continuity of the plurality of trip coils.

Further objects and advantages of the invention will become apparent from the following description taken in conjunction with the accompanying drawing in which:

BRIEF DESCRIPTION OF THE DRAWING

The sole FIGURE is a circuit diagram of improved trip-circuitry for a multi-pole circuit breaker such as three-pole circuit breaker, in accordance with an embodiment of the invention.

DESCRIPTION OF THE PREFERRED EMBODIMENT

Referring now to the circuit diagram of the drawing, which is for a three-pole electrical circuit breaker having poles P–1, P–2 and P–3 in electrical lines L–1, L–2 and L–3, respectively, the trip coils for the respective poles of the three-pole circuit breaker are indicated at 10A, 10B and 10C, respectively. Trip coils 10A, 10B and 10C when energized respectively cause tripping to open position of the respective breaker poles P–1, P–2 and P–3 as is well known in the art. The tripping circuit of the drawing is connected across lines 18 and 20 of a direct current power supply, such as 125 volts D.C.

Connected in series with the trip-coils 10A, 10B and 10C is the normally open breaker-operated auxiliary contact 16, which is closed when the breaker poles P–1, P–2, P–3 are closed. Contact 16 is operated to open position in the opening operation of the breaker.

When the breaker is closed, and before any actuation of the trip circuit has occurred, the supervisory signal device 22, which may be a red light, for example, is energized to indicate that the breaker is "ready" to trip—that is, that there is circuit continuity through each of the trip coils so that they will trip properly when the proper current pulse is supplied thereto, as will be hereinafter described. The supervisory signal device 22 is energized through the following series circuit:

From the D.C. power supply positive line 18 through auxiliary contact 16 which is closed when the breaker is closed through current limiting resistor 24, through supervisory signal device (red light) 22, to junction 40, through trip coil 10C, to junction 43, through resistance 46, through blocking diode 47 which is conductive in the direction of positive to negative, to junction 34, through trip coil 10B, to junction 38, through resistance 48 and inductance 50 to junction 52, through trip coil 10A, and thence to negative line 20 of the direct current power supply.

Thus, it will be seen that in the circuit of the drawing when the breaker is closed and prior to initiation of a tripping operation, the supervisory signal device 22 is connected in series with all three trip coils 10A, 10B, 10C so that if any one of the trip coils has an open circuit and thus is inoperative, the red light or other supervisory signal 22 will be extinguished, giving a warning of the defective condition of the trip circuit. It will be obvious, of course, that the deenergization of the supervisory signal device 22 due to an open circuit in one of the trip coils could instead be utilized through suitable relay means (not shown) to cause the energization of an alarm circuit.

In the series circuit just described in which the supervisory signal device 22 is energized when the breaker is closed and prior to initiation of a tripping operation, due to the use of current limiting resistor 24 in series with supervisory signal device 22, and also due to the additional series resistance provided by resistors 46 and 48, the current through trip coils 10A, 10B and 10C is not enough to energize the trip coils sufficiently to cause them to trip their respective breaker poles to open position. Also, the values of the circuit constants, such as the resistance values of signal device 22 and of current limiting resistor 24 are such that any charging of the various capacitors in the circuit prior to the initiation of the tripping operation by closure of contact 26 is negligible and insignificant. The tripping circuit is energized to perform the tripping operation by closure of a normally open contact 26 which may be closed either manually or by a protective relay. During an actual tripping operation, closure of contact 26 shunts supervisory signal 22 and resistor 24, so that the red light 22 is extinguished during the actual tripping operation.

While the circuit of the supervisory signal device 22 has been shown and described as being energized only when the breaker is closed, with auxiliary contact 16 being closed, it is obvious that the circuit of supervisory signal 22 including current limiting resistor 24 could be connected directly to positive line 18 without going through breaker-operated auxiliary contact 16 so that the supervisory signal circuit would be energized across the direct current power source, regardless of whether the breaker was open or closed. In this case, the supervisory signal 22 would monitor for trip coil circuit continuity when the breaker is open as well as when it is closed.

The parallel-series trip circuit can best be described in connection with its operation as follows:

When the contact 26 is closed to initiate tripping of the breaker, the three trip-coils 10A, 10B and 10C are respectively initially energized by a current pulse (the charging pulse to the capacitors in circuit with respective trip coils) in a respective one of three parallel paths, as follows:

1. Trip coil 10A is initially energized by a current pulse in the following circuit path:
From the line 18 of the direct current power supply through auxiliary contact 16, through contact 26 to junctions 28 and 40, through the parallel connected capacitors 30 and 32 to junction 34, thence through capacitor 36 to one side of trip coil 10A, through trip coil 10A, and thence to conductor 20 of the direct current power supply.

2. Trip coil 10B is initially energized by a current pulse in the following circuit path:
From line 18 of the D.C. power supply, through auxiliary contact 16, through closed contact 26 to junctions 28 and 40, through the parallel connected capacitors 30 and 32 to the junction 34, thence through trip coil 10B, to junction 38 and through the parallel connected capacitors 41 and 42 to line 20 of the D.C. power supply.

3. Trip coil 10C is initially energized by a current pulse in the following circuit path:

From line 18 of the D.C. power supply through auxiliary contact 16, through closed contact 26, through junctions 28 and 40 to one side of trip coil 10C, through trip coil 10C, to junction 43, thence through capacitor 44 to junction 38, and thence through parallel connected capacitors 41 and 42 to the negative line 20 of the power supply.

At the moment of initial closure of contact 26, a momentary charging current to the respective capacitors in each of the parallel trip coil circuits just described passes through the respective trip coils 10A, 10B and 10C. This momentary charging current to the capacitors in each of the respective parallel circuits energizes the respective trip coils 10A, 10B and 10C sufficiently to trip each of the respective breaker poles P–1, P–2 and P–3 corresponding to the respective trip coils 10A, 10B and 10C, thereby providing a fast response time for tripping of the respective breaker poles.

After the initial rush of charging current which provides the pulse to the respective trip-coils 10A, 10B and 10C sufficient to trip the breaker poles, as just explained, the various capacitors in the circuitry just described, namely, capacitors 30, 32, 36, 41, 42 and 44 become substantially completely charged and therefore nonconducting to further flow of direct current in the parallel paths just enumerated. When the capacitors in the circuitry become nonconducting to further flow of direct current, the current then must flow through the three trip coils 10A, 10B and 10C in only the following series path:

From the D.C. power supply positive line 18 through contact 16, through contact 26, past junctions 28 and 40, through trip coil 10C, to junction 43, through resistance 46, through blocking diode 47 which is conductive in the direction of positive to negative, to junction 34, through trip coil 10B, to junction 38, through resistance 48 and inductance 50 to junction 52, through trip coil 10A, and thence to negative line 20 of the direct current power supply.

The use of the blocking diode 47 in series with resistor 46 and of the inductance 50 in series with the resistor 48 are refinements which are not fundamental to the operation of the circuit but are merely for the purpose of reducing or minimizing wasted current flow through the resistors 46 and 48 during the initial energization period after closure of contact 26 when the resistors 46 and 48 are electrically in parallel with the trip coils.

During the later phase of the breaker opening operation, when the current flow to the trip coils 10A, 10B and 10C follows the series path in which the trip coils are connected in series, the current flow through the series-connected trip coils is reduced due to the fact that the resistances of the three trip coils 10A, 10B and 10C are connected in series with each other and in series with resistors 46 and 48. This results in a reduced flow of current in the series circuit of the trip coils 10A, 10B and 10C, resulting in smaller shut-off current when the breaker operated auxiliary contact 16 is opened during the final phase of the opening movement of the breaker. This reduced current in the series circuit just described minimizes arcing at the auxiliary contact 16.

All of the capacitors shown in the circuitry are assumed to have the same value of capacitance. That is, each capacitor has a value of C microfarads.

The capacitance of the capacitors in the circuits of the trip coils are so related to the time required for the auxiliary contact 16 to open that the capacitors have become substantially fully charged and nonconductive to further direct current flow before the auxiliary contact 16 has completely opened. Therefore, during the later phase of the opening movement of the breaker and of the auxiliary contact the trip coils are connected in series with each other, resulting in a smaller shut-off current in the trip circuit during the final phase of the breaker opening operation, which minimizes arcing at the auxiliary contact, as previously mentioned.

After the circuit breaker has opened, with the resulting opening of the breaker operated auxiliary contact 16, the entire tripping circuit is then disconnected from the positive bus 18 so that the charged capacitors in the circuit such as capacitors 30, 32, 36, 41, 42 and 44 may then discharge in preparation for a subsequent tripping operation. For example, the capacitor 44 would discharge in a localized circuit from the right hand side of capacitor 44 as shown in the drawing, to junction 43, through resistance 46, through blocking diode 47 to junction 34, through trip coil 10B, to junction 38, and thence back to the opposite side or left-hand side with respect to the view shown in the drawing of the capacitor 44. The other capacitors of the circuitry would discharge a similar manner through corresponding localized circuits.

It is apparent that in its broader sense the invention is applicable to circuits for energizing any number of electrical devices such as solenoids, relays, counters, etc., in which it is desired to energize a multiplicity of such devices in parallel to momentarily provide a higher state of energization of the devices, with the circuit automatically reverting to a series connection of the devices which provides a lower state of energization of the devices.

It can also be seen from the foregoing that there is provided in accordance with a specific embodiment of the present invention a circuit arrangement for the energization of the trip coils of a multipole circuit breaker in accordance with which the trip coils are effectively connected in parallel with each other during the initial phase of the breaker opening operation, thereby providing a fast response time of the trip coils which provides fast tripping of the circuit breaker, and with the plurality of trip coils being effectively connected in series with each other during the later phase of the breaker opening operation, whereby to provide a lower current through the series connected trip coils when they are being deenergized, which minimizes arcing at the auxiliary contact 16 during the opening of the breaker-operated auxiliary contact. Furthermore, the series connection of the trip coils in the circuitry arrangement permits the red light or other supervisory signal to be connected in series with the plurality of trip coils whereby to provide an indication prior to initiation of the tripping operation of whether or not there is a continuous circuit through the trip coils, as an indication of a possible open circuit condition in any one of the trip coils.

While in the specific embodiment described hereinbefore, the control circuit has been shown controlling the tripping operation of each pole of a single multipole breaker, it is obvious that a circuit of the type shown may be used to control the opening of each pole of two or more multi-pole breakers when simultaneous opening of a plurality of multi-pole breakers is desired.

From the foregoing detailed description of the present invention, it has been shown how the objects of the invention have been obtained in a preferred manner. However, modifications and equivalents of the disclosed concepts such as readily occur to those skilled in the art are intended to be included within the scope of this invention.

The embodiments of the invention in which an exclusive property or privilege is claimed are defined as follows:

1. A direct current electrical energization circuit for a plurality of electrical devices, comprising a corresponding first circuit path for each of said devices including capacitor means in series with each respective device, each of said first circuit paths being connected across a direct current supply when said circuit is energized whereby to place said plurality of devices in parallel current flow relation to each other in series with their corresponding capacitor means whereby to supply a current pulse to each respective device when said capacitor means are charging upon initial energization of said circuit, said capacitor means becoming substantially nonconductive to further flow of direct current in the respective firs circuit paths upon becoming substantially fully charged, said circuit comprising additional circuit means connecting said devices in series with each other across the source of direct current potential in a circuit path excluding said capacitor means whereby to provide an alternative current flow path for said devices when said capacitor means become substantially fully charged.

2. A direct current electrical energization circuit as defined in claim 1 in which said additional circuit means comprises at least one resistor.

3. A direct current electrical energization circuit as defined in claim 1 in which said plurality of electrical devices are the trip coils for a multi-pole electrical circuit breaker.

4. In combination, a multi-pole electrical circuit breaker having a separate trip coil operatively associated with each pole for tripping the respective pole to an open position upon energization of the corresponding trip coil, an energization circuit for said trip coils, said energization circuit comprising contact means adapted to connect said circuit to a direct current potential to initiate tripping operation of the breaker, said separate trip coil corresponding to each pole of the breaker being connected in said energization circuit, a corresponding first circuit path for each trip coil including capacitor means in circuit with the respective trip coil, each of said first circuit paths being connected across the direct current potential when said contact means is closed whereby to place each trip coil in parallel current flow relation with the other trip coils when said capacitor means are charging upon initial closure of said contact means, said capacitor means becoming substantially nonconductive to further flow of direct current in the respective first circuit paths upon becoming substantially fully charged, said energization circuit comprising additional circuit means connecting said trip coils in series with each other and in series with said contact means across the source of direct current potential in a circuit path excluding said capacitor means whereby to provide an alternative current flow path for said trip coils when said capacitor means become substantially fully charged.

5. The combination defined in claim 4 comprising a supervisory signal means connected in circuit with all of the series-connected trip coils independently of said contact means whereby to monitor the circuit continuity of all of said trip coils.

6. The combination defined in claim 4 in which said additional circuit means comprises at least one resistor.

7. The combination defined in claim 4 in which said multi-pole electrical circuit breaker has three poles.

8. The combination defined in claim 4 in which said first circuit path for each trip coil includes capacitor means in series with the respective trip coil.

9. A trip coil circuit for a multi-pole electrical circuit breaker of the type having a separate trip coil operatively associated with each pole for tripping the respective pole to an open position upon energization of the corresponding trip coil, said circuit comprising contact means adapted to connect said circuit to a direct current potential to initiate tripping operation of the breaker, said separate trip coil corresponding to each pole of the breaker being connected in said circuit, a corresponding first circuit path for each trip coil including capacitor means in circuit with the respective trip coil, each of said first circuit paths being connected across the direct current potential when said contact means is closed whereby to place each trip coil in parallel current flow relation with the other trip coils when said capacitor means are charging upon closure of said contact means, said capacitor means becoming substantially nonconductive to further flow of direct current in the respective first circuit paths upon becoming substantially fully charged, said circuit comprising additional circuit means connecting said trip coils in series with each other and in series with said contact means across the source of direct current potential in a circuit path excluding said capacitor means whereby to provide an alternative current flow path for said trip coils when said capacitor means become substantially fully charged.

10. A trip coil circuit as defined in claim 9 comprising a supervisory signal means connected in circuit with all of the series-connected trip coils independently of said contact means whereby to monitor the circuit continuity of all of said trip coils.

11. A trip coil circuit as defined in claim 9 in which said additional circuit means comprises at least one resistor.

12. A trip coil circuit as defined in claim 9 in which said multi-pole electrical circuit breaker has three poles.

13. A trip coil circuit as defined in claim 9 in which said first circuit path for each trip coil includes capacitor means in series with the respective trip coil.

14. In combination, a multi-pole electrical circuit breaker having a separate trip coil operatively associated with each pole for tripping the respective pole to an open position upon energization of the corresponding trip coil, an energization circuit for said trip coils, said separate trip coil corresponding to each pole of the breaker being connected in said energization circuit, said energization circuit including a corresponding first circuit path for each trip coil including capacitor means in circuit with the respective trip coil, each of said first circuit paths being adapted to be connected across the direct current potential in response to initiation of a breaker tripping operation whereby to place each trip coil in parallel current flow relation with the other trip coils during the interval when said capacitor means are charging upon initial connection of the respective said first circuit path to said direct current potential, said capacitor means becoming substantially nonconductive to further flow of direct current in the respective first circuit paths upon becoming substantially fully charged, said energization circuit comprising additional circuit means connecting said trip coils in series with each other in a circuit path excluding said capacitor means and adapted to be connected across the source of direct current potential whereby to provide an alternative current flow path for said trip coils when said capacitor means become substantially fully charged, and a supervisory signal means connected in series with all of the series-connected trip coils in said alternative current flow path and adapted to be connected across the direct current potential whenever the breaker is in closed position whereby to continuously monitor the circuit continuity of all of said trip coils.

15. The combination defined in claim 14 in which said first circuit path for each trip coil includes capacitor means in series with the respective trip coil.

16. The combination defined in claim 14 in which said additional circuit means comprises at least one resistor.

17. The combination defined in claim 14 in which said multi-pole electrical circuit breaker has three poles.

18. A trip coil circuit for a multi-pole electrical circuit breaker of the type having a separate trip coil operatively associated with each pole for tripping the respective pole to an open position upon energization of the corresponding trip coil, a separate trip coil corresponding to each pole of the breaker being connected in said circuit, said circuit including a corresponding first circuit path for each trip coil including capacitor means in circuit with the respective trip coil, each of said first circuit paths being adapted to be connected across a direct current potential in response to initiation of a breaker tripping operation whereby to place each trip coil in parallel current flow relation with the other trip coils during the interval when said capacitor means are charging upon initial connection of the respective said first circuit paths to said direct current potential, said capacitor means becoming substantially nonconductive to further flow of direct current in the respective first circuit paths upon becoming substantially fully charged, said circuit comprising additional circuit means connecting said trip coils in series with each other in a circuit path excluding said capacitor means and adapted to be connected across the source of direct current potential whereby to provide an alternative current flow path for said trip coils when said capacitor means become substantially fully charged, and a supervisory signal means connected in series with all of the series-connected trip coils in said alternative current flow path and adapted to be connected across the direct current potential whenever the breaker is in closed position whereby to continuously monitor the circuit continuity of all of said trip coils when said breaker is in closed position.

19. A trip coil circuit as defined in claim 18 in which said first circuit path for each trip coil includes capacitor means in series with the respective trip coil.

20. A trip coil circuit as defined in claim 18 in which said additional circuit means comprises at least one resistor.

21. A trip coil circuit as defined in claim 18 in which said multi-pole electrical circuit breaker has three poles.

* * * * *